US006568849B1

(12) United States Patent
Chen et al.

(10) Patent No.: US 6,568,849 B1
(45) Date of Patent: May 27, 2003

(54) TEMPERATURE PROBE WITH IMPROVED STRUCTURE INTEGRITY AND OPERATION RELIABILITY OVER HIGH TEMPERATURE AND VOLTAGE

(75) Inventors: Shih-Chang Chen, Hsinchu (TW); Yih-Wen Shiao, Hsinchu (TW)

(73) Assignee: Cyntec Company, Hsinchu (TW)

( * ) Notice: Subject to any disclaimer, the term of this patent is extended or adjusted under 35 U.S.C. 154(b) by 0 days.

(21) Appl. No.: 09/545,212

(22) Filed: Apr. 7, 2000

(51) Int. Cl.⁷ .................................................. G01K 1/08
(52) U.S. Cl. ......................... 374/185; 374/208; 338/25
(58) Field of Search ................................. 374/185, 208, 374/209; 338/25, 28, 229

(56) References Cited

U.S. PATENT DOCUMENTS

| 4,883,366 A | * | 11/1989 | Dohi et al. ................. 374/184 |
| 5,015,987 A | * | 5/1991 | Nixon et al. ............... 338/22 R |
| 5,149,200 A | * | 9/1992 | Shiokawa et al. ........... 374/185 |
| 5,181,007 A | * | 1/1993 | Friese et al. .............. 338/22 R |
| 5,207,765 A | * | 5/1993 | Eirmann et al. ............. 374/208 |
| 5,726,624 A | * | 3/1998 | Caffee et al. ................. 338/28 |
| 5,831,521 A | * | 11/1998 | Wienand et al. ............... 338/25 |

FOREIGN PATENT DOCUMENTS

| JP | 55039006 A | * | 3/1980 | ................. 374/185 |
| JP | 0086428 | * | 5/1983 | ................... 338/28 |

* cited by examiner

Primary Examiner—Diego Gutierrez
Assistant Examiner—Lydia M. De Jesus
(74) Attorney, Agent, or Firm—Bo-In Lin

(57) ABSTRACT

The present invention discloses a temperature probe. The temperature probe includes a temperature-sensing chip contained in a ceramic holder. The temperature probe further includes a pair of high-temperature sustainable conductive lines connected to the temperature-sensing chip. The temperature probe further includes an electrical insulation layer wrapping over the ceramic holder and high-temperature sustainable conductive lines.

19 Claims, 5 Drawing Sheets

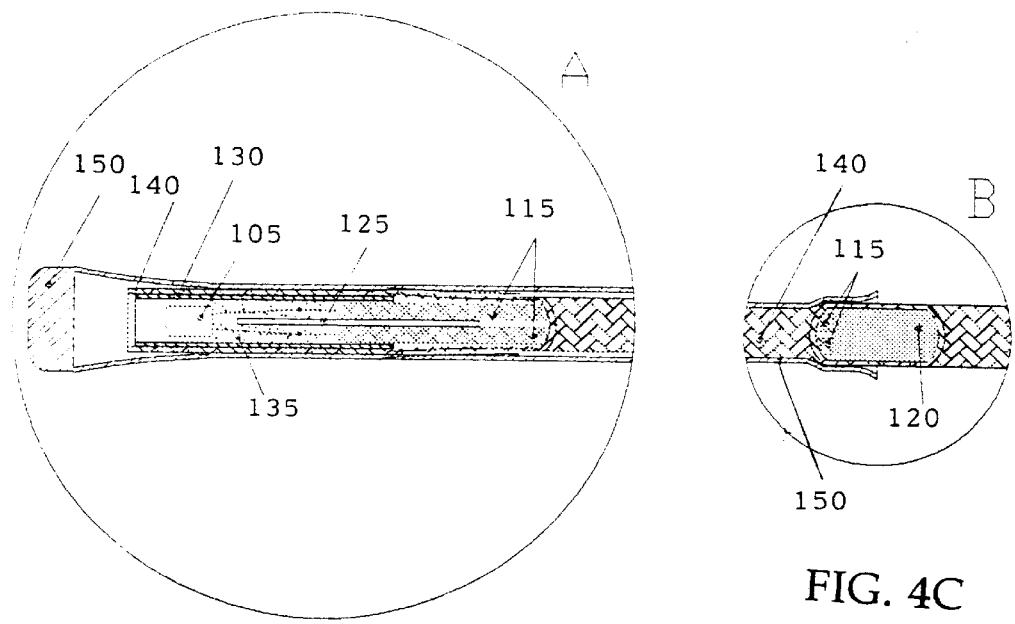
FIG. 4B
FIG. 4C
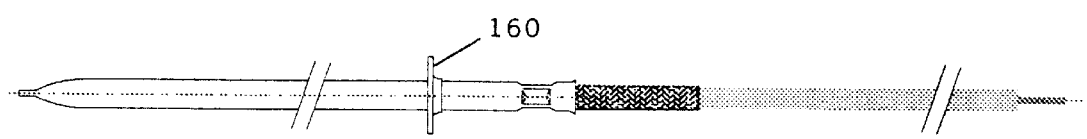
FIG. 4D
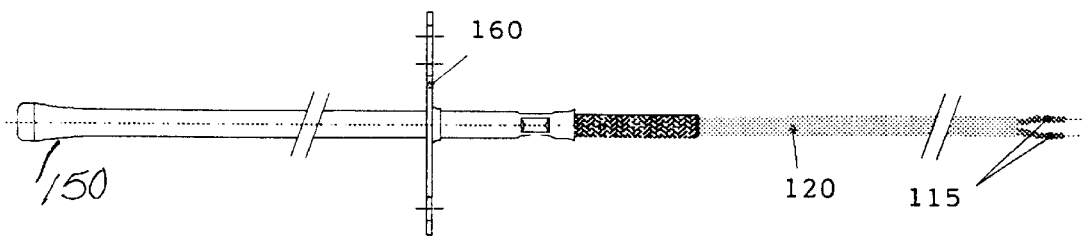
FIG. 4E

TEMPERATURE PROBE WITH IMPROVED STRUCTURE INTEGRITY AND OPERATION RELIABILITY OVER HIGH TEMPERATURE AND VOLTAGE

BACKGROUND OF THE INVENTION

1. Field of the Invention

This invention relates generally to the structure and fabrication process of a temperature probe. More particularly, this invention relates to the packaging structure and fabrication process for producing improve temperature probes that are more reliable for long term high temperature operation.

2. Description of the Prior Art

High temperature probes are still limited by the technical difficulties that the leakage currents are increased when operated at a high temperature high-voltage condition. Referring to FIGS. 1A to 1D for the structure of conventional temperature probes. In FIG. 1A, the temperature probe 10 includes a temperature sensing platinum chip 12 protected in a ceramic tube 20. The sensing platinum chip 12 is connected through two lead wires 14 to two fiberglass conductive wires 15 by welding at welding point 16. The fiberglass conductive wires 15 can sustain over high temperature. The lead wires 14 are insulated from each other by an insulation plate 17 inserted between the lead wires 14. Each of the fiberglass conductive wires wraps around a conductive line for conducting a resistance measuring current to the thin-film platinum chip 12 enclosed in the ceramic tube 20 for measuring a resistance that linearly increased versus a measured temperature. In FIG. 1B, a fiberglass tube 25 is further employed to wrap around the fiberglass conductive wires 15. Then, FIG. 1C shows a stainless steel tube 30 is employed to hold and protect the high temperature probe.

Referring to FIG. 1D for a zoomed cross section view of the interface between the fiberglass tube 25 and the ceramic holder 20. There is a small gap 35 at the interface where the fiberglass tube 25 contacts the ceramic holder 20. This small gap 35 generates a high differential voltage space between the conductive fiberglass lines 15 and the stainless steel holder 30. A leakage current is generated due to the high voltage difference between the fiberglass conductive lines 15 and the stainless steel since the stainless steel tube 30 is typically connected to a ground voltage. The leakage current may cause damages to the temperature probe. The high temperature probe has a reliability problem when operated in high temperature high-voltage condition. In order to prevent damages to the temperature probe, a transformer type of oven is provided to minimize the damages caused by the leakage current induced by high differential voltage. Transformer type of oven has a higher cost of production because additional electrical circuits have to be designed and manufactured as part of the oven.

Therefore, a need still exists in the art of manufacture and design of temperature probes to provide a new structural configuration for packaging and manufacturing the probes to overcome these limitations and difficulties. Preferably, the new configuration for manufacturing and packaging the temperature probes can assure the leakage current is maintained at a minimal level without being significant increased when the temperature is raised. Furthermore, it is desirable that the temperature probes can be reliably operated in a high temperature environment over long period of time without degradation.

SUMMARY OF THE PRESENT INVENTION

It is therefore an object of the present invention to provide a new structural configuration and method of manufacture to provide a novel temperature probe with improved insulation and structural integrity at elevated temperature and high voltage operation condition. With this new and improved temperature probe, the aforementioned difficulties and limitations as that encountered in the prior art can be overcome.

Specifically, it is an object of the present invention to provide a new process for manufacturing and structural configuration where the ceramic tube for holding a temperature-sensing chip is wrapped with a layer of fiberglass to eliminate gaps vulnerable to high differential voltage discharge. The high temperature sustainable conductive lines connected to the temperature sensing chips are further wrapped by plastic insulation tube to minimize the leakage current As the operation temperature is raised over 500° C. (Celsius), and the voltage is raised above 1250 VAC, the leakage current is kept below one milliampere (mA).

Another object of the present invention is to provide a new manufacture process and a packaging configuration to assure structural integrity of the temperature probe over long term high temperature operation. When the ceramic tube containing the thin-film platinum chip are protected and insulated with very small leakage current, the reliability of the temperature is improved.

Another object of the present invention is to provide a new manufacture process and a packaging configuration to improve the temperature measurement precision. When the ceramic tube containing the thin-film platinum chip and the conductive lines are protected and insulated with highly insulated covering layers, precision of temperature measurement is improved with a reduced leakage current.

Briefly, in a preferred embodiment, the present invention discloses a temperature probe. The temperature probe includes a temperature-sensing chip contained in a ceramic holder. The temperature probe is further connected to a pair of high-temperature sustainable conductive wires. The temperature probe further includes an electrical insulation layer wrapping over the ceramic holder and the high-temperature sustainable conductive lines such that the vulnerable gaps subject to high differential voltage discharges are eliminated. The problem of leakage current is resolved.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 4A to 4C are a cross sectional view marked with sections A and B of the probe of this invention, and explosive cross sectional views of section A and B respectively; and FIGS. 4D and 4E are two cross sectional views of the temperature probe of this invention showing the relative positions of the flange and the safety crimp for crimping the probe to the stainless steel tube.

DETAILED DESCRIPTION OF THE PREFERRED EMBODIMENT

Figure 1A:
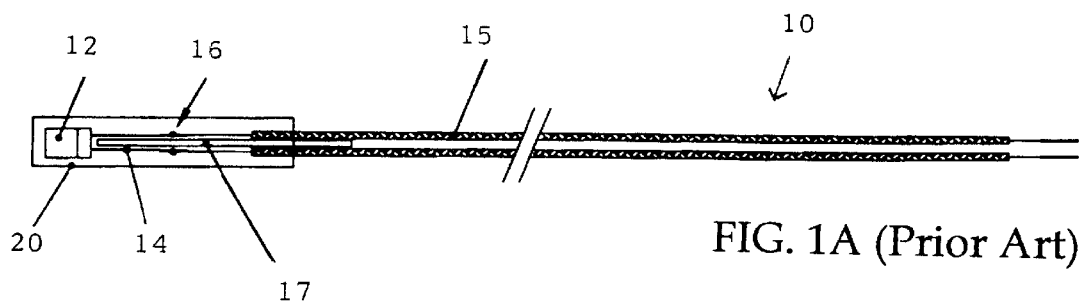
FIGS. 1A to 1D are cross section views for showing the structure of a conventional temperature probe and the vulnerable gaps arising from high differential voltage discharges.
Figure 1B:
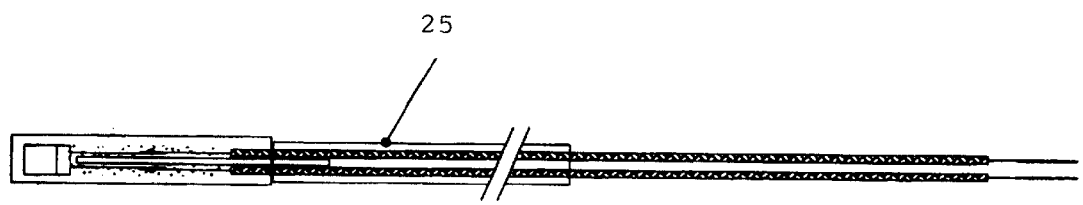
Figure 1C:
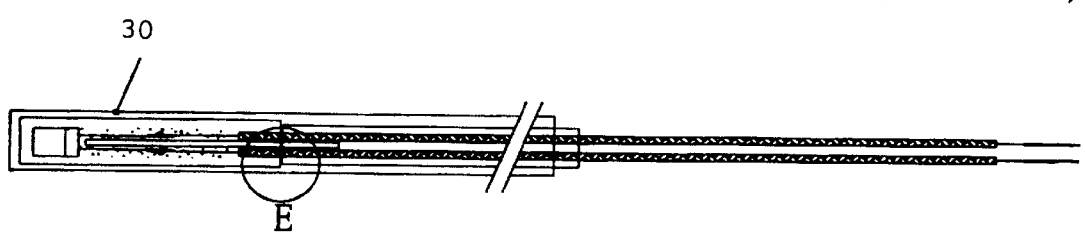
Figure 1D:
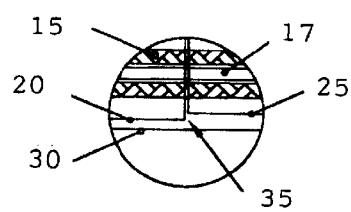
Figure 2A:
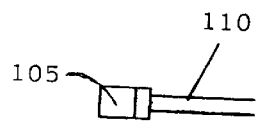
FIGS. 2A to 2G are a series of cross sectional views for showing the manufacturing processes of a temperature probe of this invention.
Figure 2B:
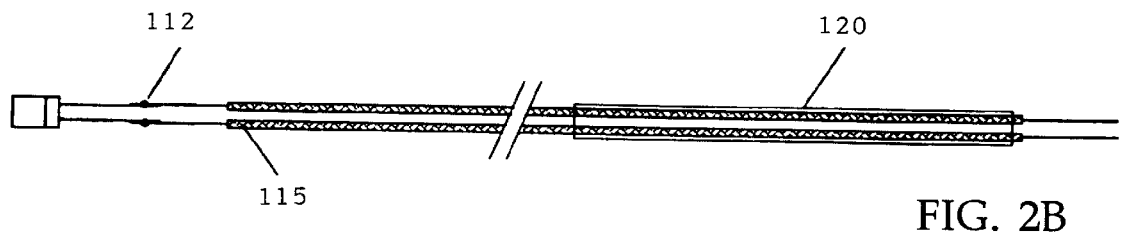
Figure 2C:
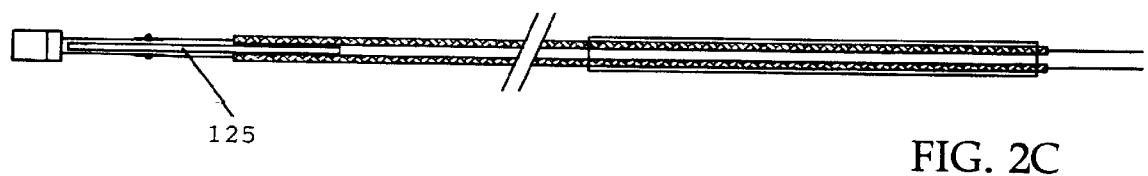

Please refer to FIGS. 2A to 2G for a series of cross sectional views for illustrating the manufacturing processes of a temperature probe of this invention. FIG. 2A shows a thin-film temperature-sensing chip 105 coated with temperature sensing platinum film connected to two conductive lines, e.g., lead wires 110, each has a diameter of approximately 0.25 mm and length of 7 mm. In FIG. 2B, the lead wires 110 are welded by welding to two high temperature sustainable conductive wires 115 composed of nickel or copper. The high temperature sustainable conductive wires 115 has an outer diameter of 1.2 mm and having a length of about 330 mm. The high temperature sustainable conductive wires 115 are wrapped in a plastic tube 120 having a length of about 160 mm as insulation tube for preventing high voltage electrical discharge. In FIG. 2C a thin insulation plate 125 is inserted between the lead wires 110 for separating and insulating the conductive lines to prevent short circuit.

Figure 2D:
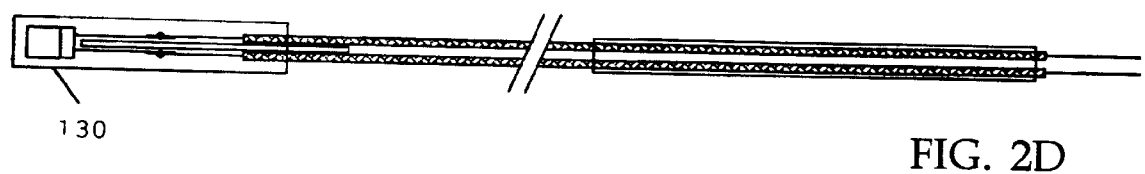
Figure 2E:
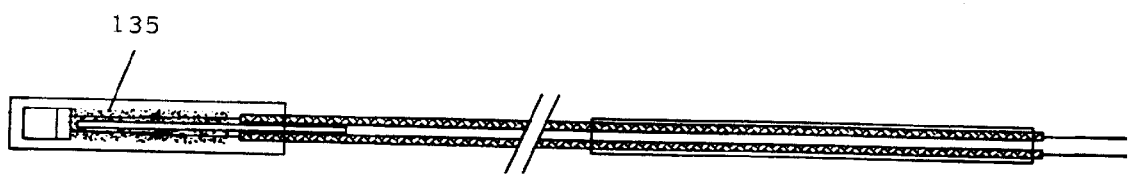
Figure 2F:
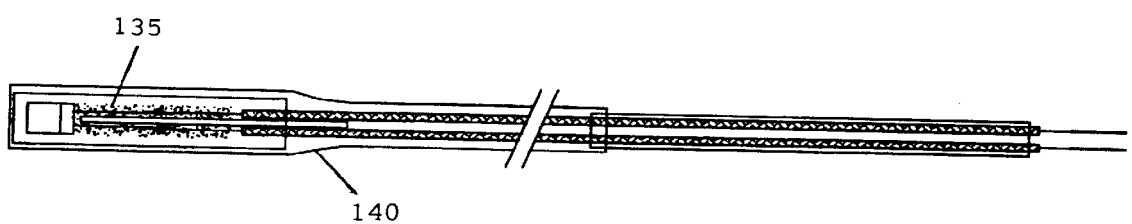
Figure 2G:
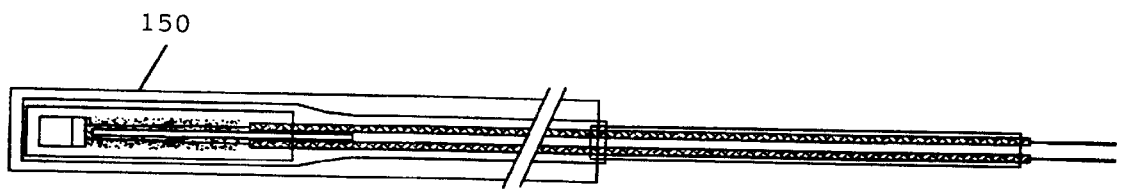

Referring to FIG. 2D, a ceramic holder 130 having an inner diameter of 2.6 mm, thickness of 0.4 mm and length of 17 mm is employed to hold the temperature-sensing chip 105. In FIG. 2E, a ceramic molding compound 135 is injected into the ceramic holder 130 to fix the chip 105, the lead wires 110, the insulation plate 125 and the high temperature sustainable conductive wire 115 securely and firmly together. Referring to FIG. 2F, a fiberglass tube 140 is employed to warp around the outer surface of the entire temperature probe covering the ceramic holder 130, the high temperature sustainable conductive lines 115 and the front end portion of the plastic tube 120. Then in FIG. 2G, a stainless steel tube 150 is employed to wrap around and protecting the temperature probe now wrapped by the fiberglass tube 140. The lead wires 110 and the high temperature sustainable conductive wire 115 are wrapped by the fiberglass tube 140 and completely insulated from the stainless steel holder 150. The problem caused by electric discharge through high differential voltage gaps formed at the interface between the ceramic holder and the fiberglass insulation layer is now eliminated.

Figure 3:
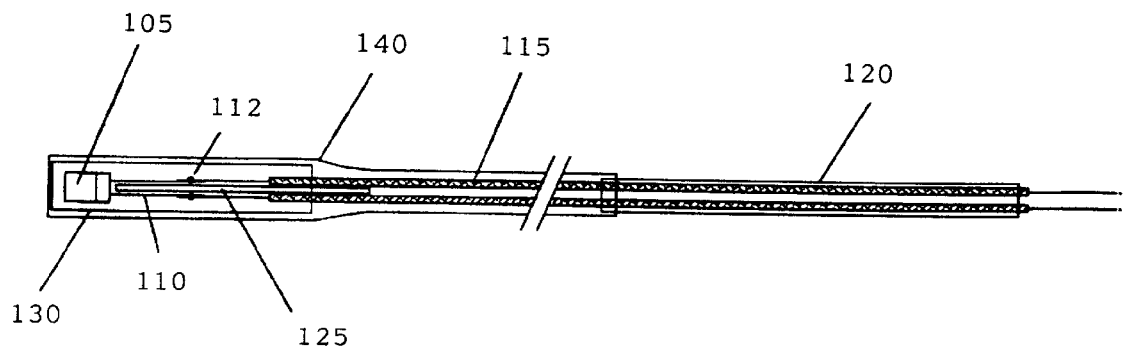
FIG. 3 is cross sectional view of a temperature probe manufactured according the processes as shown in FIGS. 2A to 2G.

According to the manufacturing processes depicted in FIGS. 2A to 2G, and above descriptions, a high temperature probe as shown in FIG. 3 is manufactured to sustain high temperature operation without the limitations as that encountered by conventional temperature probes. The temperature probe 100 includes a temperature sensing chip 105 contained in a ceramic holder 130. The temperature-sensing chip 105 is connected to lead wires 110 and these conductive lines are welded at a welding spot 112 to a pair of high temperature sustainable conductive lines 115. The rear end of the high temperature sustainable conductive lines 115 is extended away from the pair of lead wires 110 connected to the temperature-sensing chip 105. The high temperature sustainable conductive lines 115 are wrapped in a plastic tube 120. A fiberglass tube 140 then employed to cover over all the outer surface of the entire temperature probe structure including a small portion of the plastic tube 120. The gaps between the interface of the ceramic holder 130 and the fiberglass tube 140 are therefore eliminated. The problems of electrical discharges that occur in a high differential voltage across the gaps are also resolved. The problems of reliability and leakage currents resulted from damages of electrical discharges when operated continuously under high temperature high voltage conditions are also minimized.

Figure 4A:
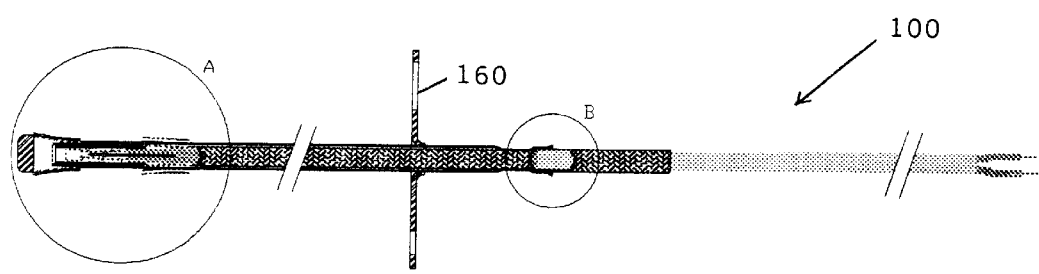

FIG. 4A is a cross sectional view of the temperature probe 100 that includes a flange 160 for securely attaching to an oven and sections A and B marked out for more detail descriptions in FIGS. 4B and 4C. From these cross sectional views specially shown for sections A and B, the stainless steel tube 150 and the fiber glass tube 140 extended beyond the flange 160 to section B. The layer configuration as shown for section B depicts that the high temperature sustainable conductive wires 115 are wrapped by the plastic tube 120 as an inner protection layer and then wrapped over by the fiberglass tube 140. The plastic tube 120 extends beyond the fiberglass tube 140 to extend outside of the oven. In FIGS. 4D and 4E, two cross sectional views of the temperature probe 100 are shown for illustrating the relative positions of the flange 160 for securely attaching the stainless steel tube 150 to the structure frame of a oven (now shown) and a safety crimp 170. The safety crimp is employed to securely crimp the temperature probe to the stainless steel tube 150.

Therefore, a temperature probe is disclosed in this invention. The temperature probe includes a temperature-sensing chip contained in a ceramic holder. The temperature probe further includes a pair of high-temperature sustainable conductive lines connected to the temperature-sensing chip wrapped in a fiberglass tube. The temperature probe further includes an electrical insulation layer wrapping over the ceramic holder and the fiberglass tube. In a preferred embodiment, the temperature probe further includes a pair of lead wires connected to the temperature-sensing chip. And, the pair of lead wires is welded to the high-temperature sustainable conductive lines at a pair of welding spots disposed in the ceramic holder. In a preferred embodiment, the temperature probe further includes an insulation wrapping tube wrapping around the high-temperature sustainable conductive lines at a portion extended away from the temperature sensing chip wherein the electrical insulation layer wrapping over the ceramic holder further wrapping around the insulation wrapping tube. In a preferred embodiment, the temperature probe further includes a stainless steel tube containing and protecting the ceramic holder with the electrical insulation layer wrapping around the ceramic holder. In a preferred embodiment, the electrical insulation layer wrapping around the ceramic holder comprising a fiberglass insulation layer. In a preferred embodiment, the high-temperature sustainable conductive lines comprising nickel or copper conductive lines. In a preferred embodiment, the temperature probe further includes a ceramic molding compound injected in the ceramic holder for securely fixing the lead wires, the high-temperature sustainable conductive lines, the welding spots and the ceramic holder.

In essence, this invention discloses a temperature probe that includes a temperature-sensing chip connected to a pair of conductive lines contained in a ceramic holder. The ceramic holder has an open end for the conductive lines to extend out wherein the open end and the conductive liens are covered by an electric insulation layer. In a preferred embodiment, the temperature probe further includes an outer protective holder containing the ceramic holder. And, the electric insulation layer further insulating the lead wires from the outer protective holder. In a preferred embodiment, the temperature probe further includes a stainless steel outer holder containing the ceramic holder. And the electric insulation layer further insulating the conductive lines from the stainless steel holder.

Therefore, a novel temperature probe is disclosed in this invention. The probe has a new structural configuration and method of manufacture to provide improved insulation at an elevated temperature. With this new and improved temperature probe, the difficulties and limitations as that encountered in the prior art are overcome. Specifically, a new process for manufacturing and structural configuration are provided where the ceramic tube for holding a temperature-sensing chip is wrapped with a layer of fiberglass to eliminate gaps vulnerable to high differential voltage discharge. The high temperature sustainable conductive lines connected to the temperature sensing chips are further wrapped by plastic insulation tube to minimize the leakage current. As the operation temperature is raised over 500° C. (Celsius), and the voltage is raised above 1250 VAC, the leakage current is kept below one milliampere (mA). A new manufacture process and a packaging configuration are provided in this invention to assure structural integrity of the temperature probe over long term high temperature operation. When the ceramic tube containing the thin-film platinum chip are protected and insulated with very small leakage current, the reliability of the temperature is improved. This new manufacture process and a packaging configuration can also improve the temperature measurement precision. When the ceramic tube containing the thin-film platinum chip and the conductive lines are protected and insulated with highly insulated covering layers, precision of temperature measurement is improved with a reduced leakage current Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A temperature probe comprising:
a temperature sensing chip contained in a ceramic holder;
a first pair of conductive wires attached to and extended from said temperature sensing chip wherein a portion of said first pair of conductive wires is wrapped around by said ceramic holder;
a second pair of conductive wires welded to said first pair of conductive wires and extended further away from said temperature sensing chip wherein a portion of said second pair of conductive wires is wrapped around by said ceramic holder, and
an electrical insulation layer wrapping over said ceramic holder and an extended portion of said second pair of conductive wires outside of said ceramic holder.

2. The temperature probe of claim 1 wherein:
said first pair of conductive wires comprises a pair of lead wires attached to and extended away from said temperature sensing chip; and
said pair of lead wires is welded to said second pair of conductive wires at a pair of welding spots enclosed in said ceramic holder.

3. The temperature probe of claim 2 further comprising:
a ceramic molding compound injected in said ceramic holder for securely fixing said first and second pairs of conductive wires, said pair of welding spots contained in said ceramic holder.

4. The temperature probe of claim 1 wherein:
an insulation tube wrapping around said second pair of conductive wires at a portion with a distance away from said ceramic holder wherein said electrical insulation layer wrapping over said ceramic holder further extended over said distance away from said ceramic holder for wrapping around a portion of said insulation tube.

5. The temperature probe of claim 4 wherein:
said insulation tube wrapping over said second pair of conductive lines comprising a fiberglass tube.

6. The temperature probe of claim 4 wherein:
said insulation tube wrapping over said second pair of conductive lines comprising a plastic tube.

7. The temperature probe of claim 1 further comprising:
a stainless steel tube containing and protecting said ceramic holder and said electrical insulation layer wrapping around said ceramic holder.

8. The temperature probe of claim 1 wherein:
said electrical insulation layer wrapping around said ceramic holder and a second insulation tube disposed at a distance away from said ceramic holder comprises a fiberglass insulation layer.

9. The temperature probe of claim 1 wherein:
said second pair of conductive wires are high-temperature sustainable conductive wires comprise nickel conductive wires.

10. The temperature probe of claim 1 wherein:
said second pair of conductive wires high-temperature sustainable conductive wires comprises copper conductive wires.

11. The temperature probe of claim 1 further comprising:
an insulation means disposed between said first pair of conductive wires for insulating said first pair of conductive wires from shorting to each other.

12. A temperature probe comprising:
a temperature sensing chip connected to a first pair of conductive lines contained in a ceramic holder;
a second pair of conductive lines welded to said first pair of conductive lines;
said ceramic holder has a open end for said second pair of conductive lines to extend out from said ceramic holder;
an insulation tube disposed at a distance away from said ceramic holder wrapping around said second pair of conductive lines extended thereto from said ceramic holder; and
an insulation layer extended from said ceramic holder to said insulation tube for wrapping around said open end of said ceramic holder and said insulation tube wrapping around said second pair of conductive lines extended thereto.

13. The temperature probe of claim 12 further comprising:
an outer protective holder containing said ceramic holder; and
said electric insulation layer further wrapping around said open end of said ceramic holder for insulating said first and second pairs of conductive lines from said outer protective holder.

14. The temperature probe of claim 12 further comprising:
a stainless steel outer holder containing said ceramic holder; and
said electric insulation layer further wrapping around said open end of said ceramic holder for insulating said first and second pair of conductive lines from said stainless steel holder.

15. The temperature probe of claim 12 further comprising:
an insulation plate for insulating said first and second pairs of conductive lines connected to said temperature sensing chip from shorting to each other.

16. The temperature probe of claim 12 further comprising:

said insulation tube disposed at a distance away from said ceramic holder further comprises a plastic tube wrapping around said second pair of conductive lines.

17. A method for manufacturing a temperature probe comprising:

attaching a first pair of conductive wires to and temperature sensing chip and extending said first pair of said conductive wires therefrom;

welding a second pair of conductive wires to said first pair of conductive wires and for extending further away from said temperature sensing chip containing said temperature sensing chip and a portion of said second pair of conductive wires in a ceramic holder; and wrapping said ceramic holder and an extended portion of said second pair of conductive wires extended outside of said ceramic holder with an electrical insulation layer.

18. The method of claim 17 further comprising:

said step of attaching said first pair of conductive wires is a step of attaching a pair of lead wires to said temperature sensing chip; and said step of welding said pair of first pair of wires to said second pair of conductive wires is a step of welding said first and second pairs of conductive wires at a pair of welding spots enclosed in said ceramic holder.

19. The method of claim 17 further comprising:

wrapping an insulation tube around said second pair of conductive wires at a portion with a distance away from said ceramic holder wherein said electrical insulation layer wrapping over said ceramic holder further extended over said distance away from said ceramic holder for wrapping around a portion of said insulation tube.

* * * * *